United States Patent [19]

Pasqua, Jr. et al.

[11] Patent Number: 5,698,150
[45] Date of Patent: Dec. 16, 1997

[54] METHOD FOR INJECTION MOLDING BALATA GOLF BALL COVERS

[75] Inventors: Samuel A. Pasqua, Jr., Bristol, R.I.; Robert N. Lammi, Norton; Lawrence E. Stanton, Stoughton, both of Mass.

[73] Assignee: Acushnet Company, Fairhaven, Mass.

[21] Appl. No.: 484,247

[22] Filed: Jun. 7, 1995

[51] Int. Cl.⁶ ........................... A63B 37/12; B29B 7/10; B29C 45/00; B29C 47/88
[52] U.S. Cl. ........................ 264/148; 264/328.1; 264/349; 473/365; 473/378
[58] Field of Search ..................... 264/37, 148, 141, 264/142, 328.1, 328.6, 349; 473/365, 378; 425/67, 201, 202

[56] References Cited

U.S. PATENT DOCUMENTS

| | | | |
|---|---|---|---|
| 2,833,750 | 5/1958 | Vickers | 264/141 |
| 3,025,565 | 3/1962 | Doriat et al. | 264/142 |
| 3,213,160 | 10/1965 | Crouch et al. | |
| 3,233,025 | 2/1966 | Frye et al. | 264/142 |
| 3,359,231 | 12/1967 | Kent et al. | |
| 3,534,965 | 10/1970 | Harrison et al. | |
| 4,065,537 | 12/1977 | Miller et al. | |
| 4,213,815 | 7/1980 | Goldberg et al. | 156/244.11 |
| 4,244,855 | 1/1981 | Cox et al. | 527/505 |
| 4,248,826 | 2/1981 | Weber | |
| 4,282,826 | 8/1981 | Wohlfeil | |
| 4,792,141 | 12/1988 | Llort | 473/378 |
| 4,984,803 | 1/1991 | Llort et al. | 473/377 |

FOREIGN PATENT DOCUMENTS 738314  7/1966  Canada.

*Primary Examiner*—Jill L. Heitbrink
*Attorney, Agent, or Firm*—Pennie & Edmonds, LLP

[57] ABSTRACT

A method for manufacturing hemispherical shells for covering a golf ball core, which comprises: mixing a quantity of balata sufficient to form a desired number of hemispherical shells configured and adapted for covering golf ball cores; transferring a predetermined quantity of the mixed balata to an extruder and extruding a plurality of strands of the balata at a temperature of between about 140° and 280° F.; cutting the strands into pellets of a desired size and injection molding the pellets into a hemispherical shell.

29 Claims, No Drawings

METHOD FOR INJECTION MOLDING BALATA GOLF BALL COVERS

FIELD OF THE INVENTION

The present invention relates to golf balls, particularly thread wound golf balls and more particularly to an injection molding process for producing balata cups used in forming covers for such golf balls.

BACKGROUND OF THE INVENTION

One step in the manufacture of a golf ball involves surrounding the inner core of the ball with two hemispherical shells or "cups". These cups are subsequently fused together by the application of heat and pressure to form the golf ball cover. A variety of materials are used by manufacturers to form these cups.

Most professional and low handicap golfers prefer balata covered balls on the basis of the "feel" and "click" provided by such balls. The use of this material in golf ball covers additionally permits the attainment of a higher spin rate and greater control when the balls is struck by the golfer's club. Balata, i.e., the trans form of the 1,4-chain polymer of isoprene, is available in both natural and synthetic form. Synthetic balata, the type most commonly used, is commercially available from suppliers such as Kuraray Ltd. of Tokyo, Japan which sells this product under the trade names TP-251 and TP-301.

The manufacture of balata covered golf balls is a costly and time consuming process due to the plurality of time and labor intensive steps involved. The process in current use for making such golf ball covers involves, first, mill mixing virgin balata compound using standard mixing techniques which are well known in the art for use with rubber formulations. As these mixing techniques are known to result in a build-up of the thermal energy in the formulation, the mixed compound must be relaxed to room temperature after mixing.

The melt flow index and specific gravity of the formulation is then determined and checked against established specifications. If the product meets these specifications it is released for further processing. Otherwise, it is rejected and recycled.

The released virgin material is weighed and then heat treated in an oven to soften it. The softened balata is thereafter blended in a mill with a predetermined amount of scrap balata, comprising generally about 60–80% by weight of the total mixture. This scrap balata is obtained from the further processing steps described below. The virgin material is first heated before being combined with the scrap in order to reduce the time necessary for mixing with the scrap material.

After the virgin and scrap are homogeneously blended, a sheet of this material approximately 30"×30" by ⅝" is slabbed off and allowed to cool to room temperature. The melt flow index and specific gravity of the sheet material are again determined and compared to the established standards. Those samples not meeting these standards are reprocessed into acceptable material.

The released material is then reduced in size to a cube measuring approximately 1"×1"×⅝" by cross-cutting with a steel gang die. This process is known as a Seelye cut and left-over material from the cutting process is recycled as scrap to the blending step described above. The cubes produced by the Seelye cut are placed in a cup mold and subjected to elevated temperatures and pressures. This treatment causes the compound to flow into the desired hemispherical shape.

Cold water is introduced into the mold platens to harden the softened mass and to permit removal of the cups from the mold. During the molding process, flash is generated to prevent some of the mold cavities from remaining unfilled and facilitate removal from compression mold. The removal of this flash, using a process referred to as cup die-out which is well known in the art, provides additional scrap for blending with the virgin balata.

Once the hemispherical shells are removed from the die, the golf balls are assembled by placing two cups around each wound core. These cup/core assemblies are thereafter placed within a compression molding press and subjected to elevated temperature and pressure to form the golf ball cover. Here again, excess material, i.e., flash, is added to prevent non-filling of some of the mold cavities. This excess material is useful in relieving trapped gasses to alleviate surface blemishes on the balls and produces additional scrap material to be blended with the virgin balata. The molded balls are thereafter removed from the platens with the assistance of a flow of cold water, after which they are finished in a manner well known to those in the art in preparation for commercial sale.

As can be seen from the discussion above, the steps of the prior art process are very labor-intensive, requiring significant outlays of time and energy by a number of skilled workers. There has thus been a long-felt need among those working in this field for a cheaper and faster manufacturing process for producing balata covered golf balls which avoids the drawbacks of the multi-step method utilized in the prior art.

SUMMARY OF THE INVENTION

It is therefore an object of the present invention to provide a method for producing balata golf ball covers which is more economical and less time-consuming than the prior art compression molding process previously used for this purpose.

It is another object of this invention to eliminate several previously required process steps used in forming prior art balata covered golf balls with the use of a more economical injection molding technique.

The present invention therefore comprises a method for manufacturing hemispherical shells for covering a golf ball core. The method comprises mixing a quantity of virgin balata with one or more additives, including but not limited to vulcanizing agents, catalysts and filler materials, to produce an amount of a mixed balata compound sufficient to form a desired number of hemispherical shells configured and adapted for covering golf ball cores.

Thereafter, the mixed balata is transferred to a drop mill where it is strip fed as a slab or sheet adapted to facilitate handling and extrusion. These slabs/sheets are removed from the drop mill and transferred, e.g., by conveyor, in a batch or a continuous manner, to an extruder, whereupon a plurality of strands of said balata are extruded at a temperature of between about 140° F. and 280° F. The strands are then cut into pellets of a desired size, preferably by means of rotating pelletizing blades located downstream from the extruder die plate and operatively associated with the extruder. The pelletizing blades are capable of operation at varying speeds, with the speed chosen being dependent upon the size of the pellet desired. The pellets are cooled in a chilled water bath and then dried. The dried pellets are fed to the hopper of an injection molding machine either as virgin stock or proportional with granulated matrix scrap, wherein the pellets are conveyed along the plasticizing unit and then injected into the cold mold. When the hemispheres are sufficiently rigid, they are removed from the mold.

Two of such shells are thus positioned in face to face relation around each ball core and compression molded around the core to form the finished ball. The excess matrix scrap produced as a by-product of the compression molding step is granulated and then mixed with Balata pellets in a blending step carried out prior to the injection molding stage.

DETAILED DESCRIPTION OF THE PREFERRED EMBODIMENT

In the present method virgin balata is first mixed, e.g., in a mill mixer or other conventional rubber mixing device, with one or more additives. These additives, which are commonly utilized in the rubber handling art, may include but are not limited to, vulcanizing agents, catalysts, i.e., accelerating agents to promote vulcanization and inert filler or "extender" materials.

During the mixing process, or alternately once mixing is completed, the melt flow index and specific gravity of the material are determined and compared to a set of standard values established according to the intended application for the material. The preferred melt flow index for these materials ranges between about 0.2 and about 2.0, while the desired specific gravity is between about 1.0 and about 1.5. Materials which meet the specified requirements are released, while those that do not are recycled for further processing.

The balata compound is then discharged into a drop mill, which is well known in the art, and which is adapted for forming the balata material into slabs or sheets to facilitate transfer to the extruder or for making pigs for use in a Barwell process. After blending on the drop mill the compound is stripped off of the mill by a series of knives located adjacent to the mill rollers in segments measuring approximately 3.5"×0.090" and fed, preferably by a conveyor, into an extruder.

In the preforming process, the slab or sheet is rolled to form a pig and one or more of the pigs is feed into a Barwell machine where the balata is ram type extruded.

As is well known in the art, extruders have preset zone barrel heaters and a revolving flight heated screw which transports the material to a heated die plate. In the method of the present invention, the extruder temperature is preferably maintained at between about 140° and 280° F. and most preferably at between about 180° to 240° F. The balata is forced through a series of holes in the die plate, thus forming elongated strands of this material.

The extruded balata strands are thereafter cut to pellets of a predetermined length by rotating pelletizing blades operatively associated with the extruder and located downstream from the die plate, which are capable of operating at a variable speed. The speed of rotation of the blade governs the length of the pellet. The length of the pellet varies with the diameter of the strand, which may range up to about 0.5 inch. The die plate configuration preferred for use with the method of the present invention preferably produces a cylindrical pellet measuring approximately 3/16" in diameter by about 1/10" in thickness. Pellets having sizes differing from that described above may, of course, be produced depending upon the intended application. The shape of the pellet is determined by the orifice design chosen. Any size or shape pellet can be used so long as it is not too heavy to be transported in the dewatering process described below.

After exiting the cutting chamber, the pellet enters a chilled water bath maintained at a temperature of between about 40° and 120° F. and preferably at about 60° F. The chilled water serves to quickly cool the hot pellets and prevents the pellets from adhering to each other and thus forming agglomerations which could lead to clogging of the system. The cooling water also serves as a transport media for moving the pellets along to a dewatering station located downstream from the extruder. The temperature chosen for the water bath is directly dependent upon the desired dwell time of the pellet in the cooling stream, with lower temperatures requiring a shorter dwell time.

The water/pellet mixture is thus dewatered in a centrifugal dryer at ambient temperature as are well known to those of ordinary skill in the art. The dried pellets are thereafter deposited onto a screen which allows the fines to pass through for recycling, i.e., regrinding, while retaining those pellets having a diameter larger than the screen mesh for injection molding. As would be apparent to one skilled in the art, the mesh size of the screen is chosen according to the preferred particle size desired for use in a particular application.

The process described above is well known among those who work in the rubber and plastics industry and is commonly referred to as "underwater pelletizing".

Once the balata pellets are produced by the underwater pelletizing technique, they are blended together using a blending apparatus well known in the prior art with reground matrix scrap balata produced as a by-product of the compression molding process used to form the completed golf ball as described below. Due to the reduction in the number of processing steps in the method of the invention, as compared to the prior art method described above, the proportion of scrap balata produced is significantly reduced, thus enabling a proportionate reduction in the amount of scrap used in forming the hemispherical shells or cups, of the invention, i.e., from about 60–80 wt. % to between about 20 to 60 wt. % and typically about 40 wt. %. This results in significantly lower handling costs, less wastage and an improved product due to the reduced amount of scrap present.

Prior to being blended with the virgin material, however, the scrap balata is first granulated. Granulators, which are well known in the art, have a screen mounted adjacent a set of rotating knives, which screen is adapted to allow passage only of particles meeting a predetermined size limitation (dependent upon the screen mesh size) while maintaining the remaining material in the cutting chamber until it is chopped into pieces small enough to pass through the screen.

One problem with granulating trans-polyisoprene, i.e, balata, however, is that this material has a low softening point (i.e., 130° F.). Once the machine heats up due to friction produced in the cutting chamber, it masticates the compound, which eventually masses together and chokes the machine. This difficulty has been overcome, however, by introducing liquid nitrogen into the cutting chamber to maintain both the material and the machine at a sufficiently low temperature to prevent massing.

The blended balata is thereafter transferred to a hopper where it is injection molded into hemispherical shells or cups by the application of heat and pressure in a manner well known in the art. The particles of the blended material transferred to the hopper must be of a size sufficient to prevent bridging, i.e., clogging, of the throat of the hopper, e.g., less than about ½" in diameter and/or about ½" in length. The injection unit causes the compound to flow within the mold into the desired cup shape. The mold is held at a constant temperature between 30° F.–80° F., with a desired temperature of 40° F., which cools the material to allow for removal.

The cups are removed from the mold and the balls are thereafter assembled by placing two cups in face to face relation around each ball core. These assemblies are then compression molded in a known manner by the application of heat and pressure, which causes the cover material to flow so as to completely cover the golf ball. The resultant matrix scrap is reground and recycled back to the blending step. The balls are thereafter finished in the well-known manner, after which they are packaged for commercial sale.

While it is apparent that the invention herein disclosed is well calculated to fulfill the objects above stated, it will be appreciated that numerous modifications and embodiments may be devised by those skilled in the art and it is intended that the appended claims cover all such modifications and embodiments as fall within the true spirit and scope of the present invention.

We claim:

1. A method for manufacturing hemispherical shells for covering a golf ball core, which comprises:
    (a) mixing a quantity of balata with at least one additive selected from the group consisting of vulcanizing agents, fillers and accelerating agents to produce a mixed balata compound in an amount sufficient to form a desired number of hemispherical shells configured and adapted for covering a corresponding number of golf ball cores;
    (b) transferring a predetermined quantity of said mixed balata compound to an extruder and extruding a plurality of strands thereof at a temperature of between about 140° and 280° F.;
    (c) cutting each said strand into a plurality of pellets; and
    (d) injection molding each said pellet into one of said hemispherical shells.

2. The method of claim 1 wherein said strands are extruded at a temperature of between about 180° and 240° F.

3. The method of claim 1 further comprising conveying said cut pellets in a chilled water bath to cool the pellets and to prevent agglomeration thereof.

4. The method of claim 3 wherein said chilled water bath is maintained at a temperature of between about 40° F. and 120° F.

5. The method of claim 4 wherein said water bath is maintained at a temperature of about 60° F.

6. The method of claim 3 which further comprises removing at least a substantial portion of the water from said pellets after immersion in said chilled water bath.

7. The method of claim 6 wherein said pellets are dewatered in a centrifugal dryer.

8. The method of claim 1 wherein said pellets are cut by contact of said strands with rotating pelletizing blades operatively associated with said extruder, said blades capable of being rotated at a variable speed.

9. The method of claim 8 wherein said variable speed blades are rotated at a speed sufficient to produce a substantially cylindrical pellet having a length of between about 0.1 to about 0.5 inch and a diameter of up to about 0.5 inch.

10. The method of claim 9 wherein the pelletizing blades are rotated at a speed sufficient to produce a pellet measuring about 3/16" in diameter and about 1/10" in thickness.

11. The method of claim 1 which further comprises blending a quantity of scrap balata with said mixed balata prior to injection molding said shells to permit recycling of excess balata produced as a by-product of a compression molding step.

12. The method of claim 11 wherein the amount of said scrap ranges between about 20 to 60% by weight.

13. The method of claim 12 wherein the ratio of said scrap to said mixed balata is approximately 40:60 percent by weight.

14. A hemispherical shell configured and adapted for covering a golf ball core produced according to the method of claim 1.

15. A method for manufacturing hemispherical shells for covering a golf ball core, which comprises:
    (a) mixing a quantity of balata with at least one additive selected from the group consisting of vulcanizing agents, fillers and accelerating agents to produce a mixed balata compound in an amount sufficient to form a desired number of hemispherical shells configured and adapted for covering a corresponding number of golf ball cores;
    (b) drop milling the mixed balata compound into a slab or sheet adapted for processing by an extruder;
    (c) transferring a predetermined quantity of said mixed balata compound to said extruder and extruding a plurality of strands thereof at a temperature of between about 140° and about 280° F.;
    (d) cutting each said strand into a plurality of pellets; and
    (e) injection molding each said pellet into one of said hemispherical shells.

16. The method of claim 15 which further comprises stripping said balata from said drop mill for transfer into said extruder in segments measuring about 3.5" by about 0.090".

17. The method of claim 15 which further comprises blending a quantity of scrap balata with said mixed balata prior to injection molding said shells to permit recycling of excess balata produced as a by-product of a compression molding step.

18. The method of claim 17 wherein the amount of said scrap ranges between about 20 to 60% by weight.

19. The method of claim 18 wherein the ratio of said scrap to said mixed balata is approximately 40:60 percent by weight.

20. The method of claim 15 wherein said strands are extruded at a temperature of between about 180° and 240° F.

21. The method of claim 15 further comprising conveying said cut pellets in a chilled water bath to cool the pellets and to prevent agglomeration thereof.

22. The method of claim 21 wherein said chilled water bath is maintained at a temperature of between about 40° F. and about 120° F.

23. The method of claim 22 wherein said water bath is maintained at a temperature of about 60° F.

24. The method of claim 21 which further comprises removing at least a substantial portion of the water from said pellets after immersion in said chilled water bath.

25. The method of claim 24 wherein said pellets are dewatered in a centrifugal dryer.

26. The method of claim 15 wherein said pellets are cut by contact of said strands with rotating pelletizing blades operatively associated with said extruder, said blades capable of being rotated at a variable speed.

27. The method of claim 26 wherein said variable speed blades are rotated at a speed sufficient to produce a substantially cylindrical pellet having a length of between about 0.1 to about 0.5 inch and a diameter of up to about 0.5 inch.

28. The method of claim 27 wherein the pelletizing blades are rotated at a speed sufficient to produce a pellet measuring about 3/16" in diameter and about 1/10" in thickness.

29. A hemispherical shell configured and adapted for covering a golf ball core produced according to the method of claim 15.

* * * * *